Figure 1:
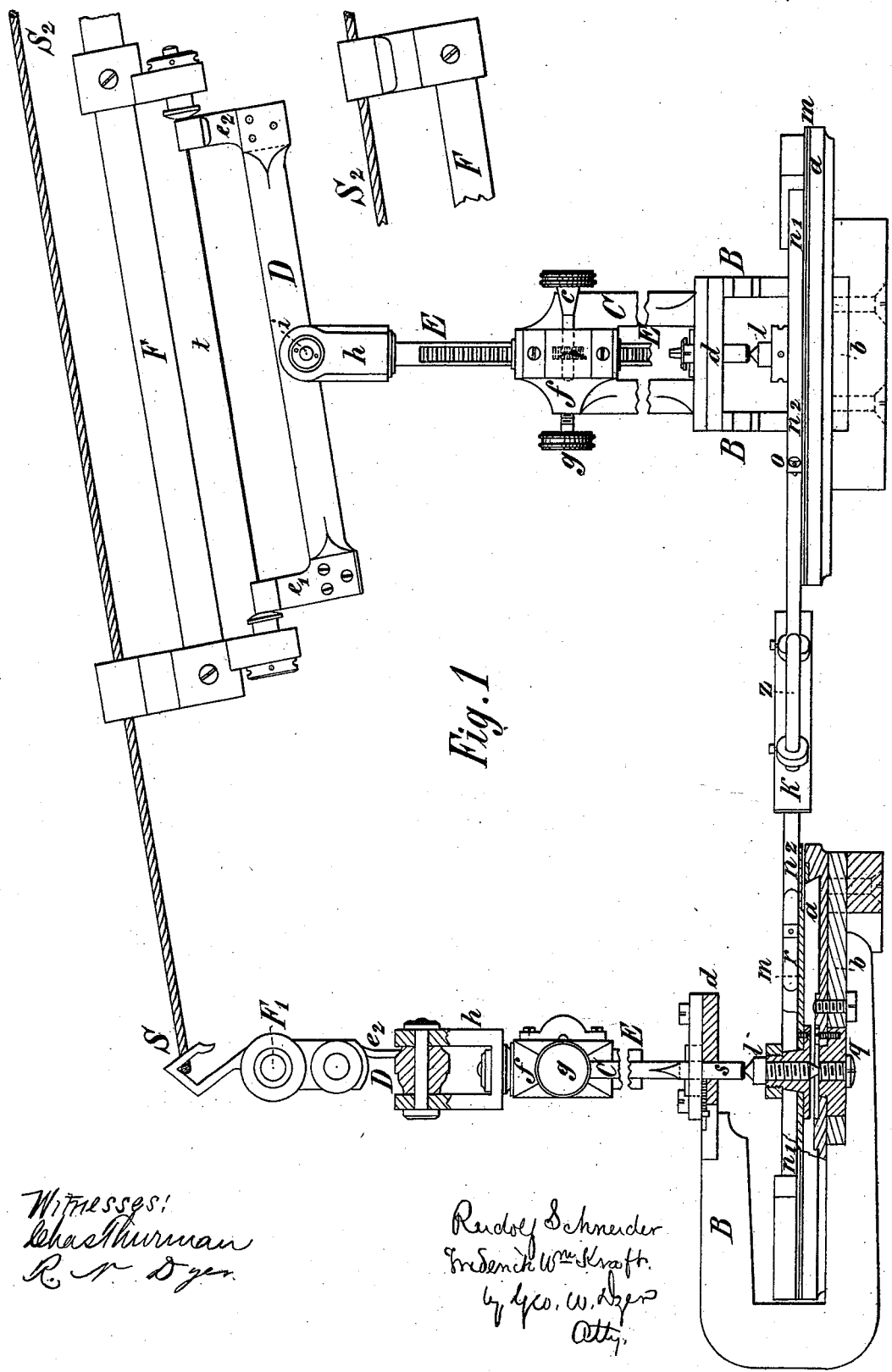
Figure 2:
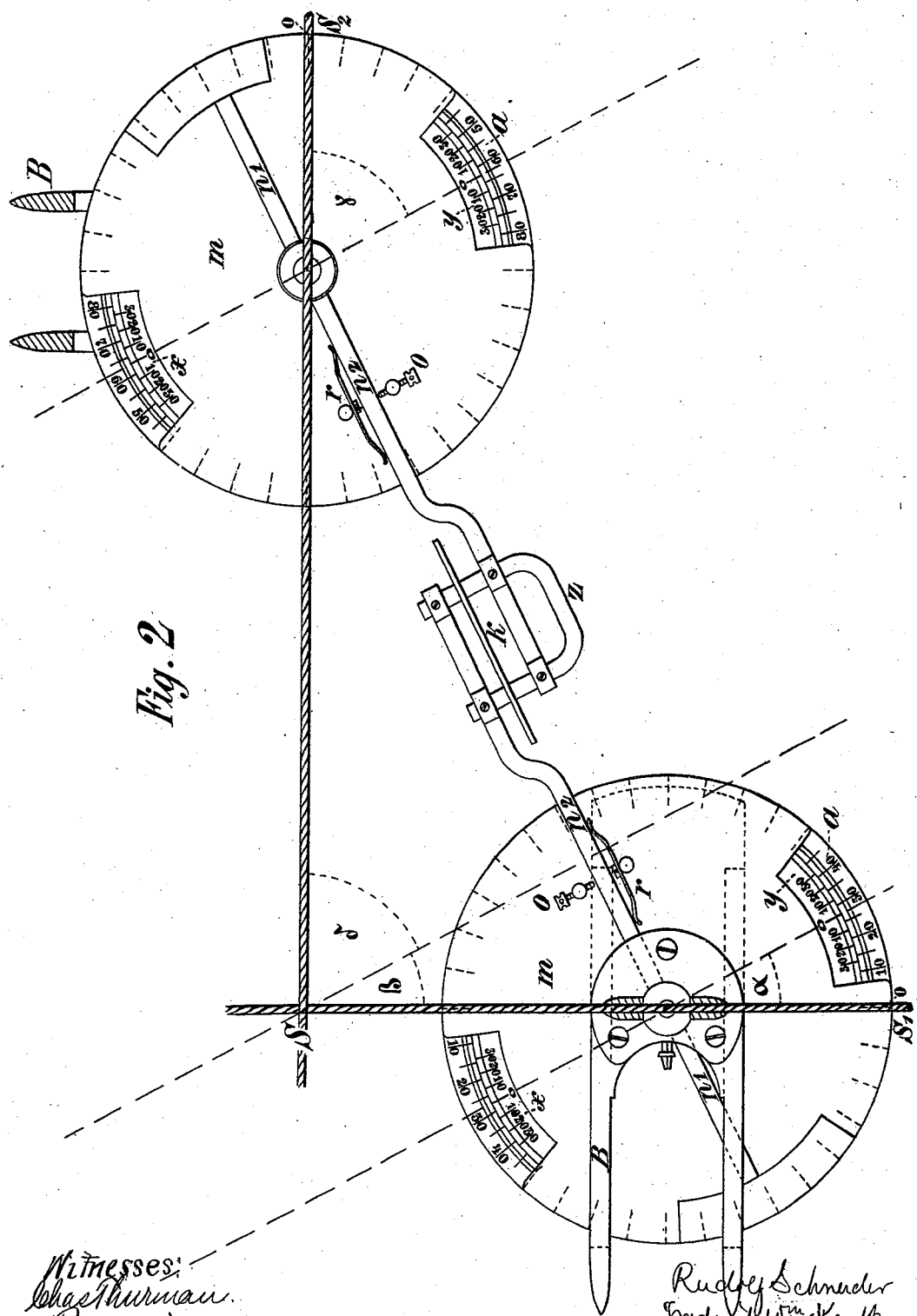

R. SCHNEIDER & F. W. KRAFT.
SURVEYING INSTRUMENT.

No. 173,068. Patented Feb. 1, 1876.

2 Sheets—Sheet 2.

R. SCHNEIDER & F. W. KRAFT.
SURVEYING INSTRUMENT.

No. 173,068. Patented Feb. 1, 1876.

UNITED STATES PATENT OFFICE.

RUDOLF SCHNEIDER, OF SEGEN GOTTES, NEAR ROSSITZ, AND FREDERICK WILLIAM KRAFT, OF VIENNA, AUSTRIA.

IMPROVEMENT IN SURVEYING-INSTRUMENTS.

Specification forming part of Letters Patent No. 173,068, dated February 1, 1876; application filed January 11, 1876.

*To all whom it may concern:*

Be it known that we, RUDOLF SCHNEIDER, of Segen Gottes, near Rossitz, in Moravia, Empire of Austria, and FREDERICK WILLIAM KRAFT, of Vienna, Empire of Austria, have invented a new and useful Improvement in Instruments for Measuring Angles, of which the following is a specification:

This invention relates to surveying-instruments, and more especially to instruments to be used in mining-surveys for measuring angles.

The construction is such as to render the use of a compass unnecessary, thereby obviating all the difficulties and delays arising from the deviation and the variation of the compass-needle, and enabling the measurements to be made more accurately and quickly.

The apparatus consists of two exactly similar instruments, which are to be suspended separately on two stretched cords, and are connected together, preferably, by means of a horseshoe-magnet attached to the one, and a steel-plate attached to the other instrument. Each of these twin instruments consists of a graduated disk, $a$, divided into three hundred and sixty or four hundred degrees. This graduated disk is screwed to a plate, $b$, fixed to the lower part of a bent carrier, B. The upper part of this carrier B is provided with a round plate, $d$, on which a double-armed bracket, C, is screwed vertically and in a central position to the graduated disk $a$. The bracket C is provided at its upper end with a box-head, $f$, through which a prismatic bar, E, passes vertically, and this bar is toothed along its entire length, so that it can be fixed at any point by means of a thumb-screw, $g$. The box-head $f$ is also provided with a pinion, $c$, the teeth of which gear into the teeth of the prismatic bar E. By turning this pinion the relative position of this rack E to the bracket C can be varied at will. The rack E carries at one end a forked head, $h$, carrying the cross-arm D, which works on a pin, $i$, in the fork $h$, and is provided with a suspension-hook, $e^1$ and $e^2$, at each end. By means of these hooks the instrument can be suspended either direct from the cord, or indirectly from an intermediate suspension-rail, F, hung to the cord. In the center of the graduated disk $a$ a screw, $g$, is fitted, forming a pivot-socket, and opposite to this screw, in the upper part $d$ of the carrier, a steel pin, $s$, with conical socket, is fixed. These two sockets form the bearings for the pivot-pin $l$, to which a plate carrying the verniers $x\ y$ is firmly attached. On this pivot-pin $l$ the arm $n$ turns, which forms the means of connecting the one instrument with its twin instrument. This connecting-arm consists of two parts, $n^1$ and $n^2$, of unequal length. The shorter part $n^1$ is provided with a weight, in order to counterbalance the longer part $n^2$. This longer part $n^2$ carries at its free end either a smooth magnetized steel plate, $k$, or a horseshoe-magnet, $z$, with smooth contact-surfaces, the one of the twin instruments being provided with the steel plate, and the other with the magnet. The vertical contact-surfaces of the steel-plate and the magnet are arranged so as to be in the same plane as the axis of the plate carrying the verniers. The turning-plate $m$, which covers the entire graduated plate, except at two places, where it is cut away, carries two verniers, $x\ y$, which lie in the vertical diameter of the arm $n$, and are graduated as desired. By means of an adjusting-screw, $o$, fixed to the turning-plate $m$, the arm $n$ can be slightly turned for the purpose of adjusting its position to the cross-direction of the verniers $x\ y$. A spring, $r$, fixed on the other side, opposite to the adjusting-screw, affords the necessary counter-pressure.

When in use each instrument is suspended by its hooks from an intermediate suspension-rail hung to the cord. This suspension-rail F is provided with two hooks to be attached to the cord, and carries between two shoulders a wire, $t$, which can be stretched by suitable nuts. The instrument is hooked to the wire of the suspension-rail, the length of which, being, preferably, about three feet, or more than five times that of the space between the suspension-hooks of the instrument itself, serves as means for obviating errors arising from irregularities of the suspension-cord. On account of the movable joints formed by the cross-arm D on the suspension-wire $t$, and by the hooks $e^1\ e^2$ and bracket-pin $i$, the weight of the graduated plate is alone sufficient to insure its horizontal position. These movable joints might evidently be also obtained by the use of knife-edges or pivot-points instead of a pivot-pin and hooks.

The arrangement of the adjustable rack and bracket is necessary, in order to enable the twin instruments to be brought into the same horizontal plane should the suspension-cords have to be fixed at different heights.

Whatever angle is formed by the two suspension-cords will be indicated by the graduated plates and verniers of the two instruments hanging from the cords, as the plates (alidades) carrying the verniers and connected together, as described, turn on the fixed graduated plates differently, and, therefore indicate different degrees according to the different relative positions of the two instruments to each other.

The angle $B + d$, formed by the two cords $S\ S^1$ and $S\ S^2$, will, therefore, be equal to the angles $x + y$. In the instance shown in the drawings the angle $x$ is twenty-seven and a half degrees, and $y$ sixty-two and a half degrees; therefore the angle formed by the cord is ninety degrees. It is evident that the two cords $S\ S^1$ and $S\ S^2$ may be either of one single piece stretched round a hook at the point $S$, or of two separate pieces crossing each other.

We claim—

1. An apparatus for measuring angles, consisting of two twin instruments, suspended separately, and having their vernier plates connected together by projecting arms, substantially as and for the purposes set forth.

2. The combination of the carrier B, graduated plate $a$, pivoted vernier-plate and turning connecting-arm $n^1\ n^2$, substantially as and for the purposes set forth.

3. The connecting-arms, with horseshoe-magnet $z$, and magnetized plate $k$, substantially as and for the purposes set forth.

4. The swinging suspension arrangement, consisting of the fork $h$, pin $i$, cross-bar D, hooks $e^1\ e^2$, or their equivalents, in combination with the suspension-rail F, or its equivalent, substantially as and for the purposes described.

5. The arrangement for adjusting the level of each instrument, and consisting of the rack E, pinion $c$, and fixing screw $g$, or their equivalents, substantially as and for the purposes described.

6. The suspension-rail F, substantially as and for the purposes described.

RUDOLF SCHNEIDER.
FREDERICK WILLIAM KRAFT.

Witnesses:
C. O. PAGET,
F. BARTA.